United States Patent
Hishmeh

(10) Patent No.: US 12,317,298 B2
(45) Date of Patent: *May 27, 2025

(54) SYSTEMS, DEVICES, AND METHODS RELATED TO CONFIGURING MULTI-STREAM NETWORK BASED ON STREAM CAPABILITY

(71) Applicant: SKYWORKS SOLUTIONS, INC., Irvine, CA (US)

(72) Inventor: Samuel F. Hishmeh, Nolensville, TN (US)

(73) Assignee: Skyworks Solutions, Inc., Woburn, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/606,971

(22) Filed: Mar. 15, 2024

(65) Prior Publication Data

US 2024/0306175 A1 Sep. 12, 2024

Related U.S. Application Data

(63) Continuation of application No. 18/211,995, filed on Jun. 20, 2023, now Pat. No. 11,937,279.

(60) Provisional application No. 63/354,227, filed on Jun. 21, 2022.

(51) Int. Cl.
*H04W 72/51* (2023.01)

(52) U.S. Cl.
CPC .................................. *H04W 72/51* (2023.01)

(58) Field of Classification Search
None
See application file for complete search history.

(56) References Cited

U.S. PATENT DOCUMENTS

| | | | |
|---|---|---|---|
| 8,259,738 B2 | 9/2012 | Sgouros et al. | |
| 8,819,219 B2 | 8/2014 | Vandwalle et al. | |
| 9,853,714 B2 | 12/2017 | Bobrek et al. | |
| 10,164,726 B2 | 12/2018 | Testicioglu et al. | |
| 2001/0037507 A1* | 11/2001 | Mori | H04N 21/812 348/E7.063 |
| 2010/0107202 A1* | 4/2010 | Gerard | H04N 7/17318 725/105 |
| 2011/0107341 A1 | 5/2011 | Longobardi et al. | |
| 2016/0105902 A1 | 4/2016 | Hirsch et al. | |
| 2017/0150225 A1* | 5/2017 | Trollope | H04N 21/47214 |
| 2017/0164020 A1* | 6/2017 | Li | H04N 21/222 |
| 2021/0281618 A1 | 9/2021 | Mosur et al. | |
| 2022/0407835 A1* | 12/2022 | Zean | H04L 51/18 |

* cited by examiner

*Primary Examiner* — Quang N Nguyen
(74) *Attorney, Agent, or Firm* — Chang & Hale LLP

(57) ABSTRACT

In some embodiments, a system can include a first stream to be opened with an arbiter device, the first stream associated with a first set of capabilities, a second stream to be opened with the arbiter device, the second stream associated with a second set of capabilities, and a wireless network architecture that determines a network messaging schedule based on the first set of capabilities and the second set of capabilities. The network messaging schedule can be sent to one or more client devices associated with the first stream or the second stream.

20 Claims, 4 Drawing Sheets

SYSTEMS, DEVICES, AND METHODS RELATED TO CONFIGURING MULTI-STREAM NETWORK BASED ON STREAM CAPABILITY

CROSS-REFERENCE TO RELATED APPLICATION(S)

This application is a continuation of U.S. application Ser. No. 18/211,995 filed Jun. 20, 2023, entitled SYSTEMS, DEVICES, AND METHODS RELATED TO CONFIGURING A MULTI-STREAM NETWORK WITH A MESSAGING SCHEDULE, now U.S. Pat. No. 11,937,279 issued Mar. 19, 2024, which claims priority to U.S. Provisional Application No. 63/354,227 filed Jun. 21, 2022, entitled CONFIGURING A MULTI-STREAM NETWORK WITH A MESSAGING SCHEDULE, the disclosures of which are hereby expressly incorporated by reference herein in their entirety.

BACKGROUND

Field

The present disclosure relates to improving availability or usage of bandwidth for a network topology having multiple wireless device connections.

Description of the Related Art

An electronic device such as a computer, tablet, smartphone, or the like can interface with a user through a number of interface devices. Such interfacing functionality can be controlled and/or supported by, for example, an arbiter attached to or part of the electronic device, so as to allow appropriate transfer of information between the electronic device and the interface devices.

SUMMARY

In accordance with a number of implementations, the present disclosure relates to a system including: a first stream to be opened with an arbiter device, the first stream associated with a first set of capabilities; a second stream to be opened with the arbiter device, the second stream associated with a second set of capabilities; and a wireless network architecture that determines a network messaging schedule based on the first set of capabilities and the second set of capabilities, the network messaging schedule sent to one or more client devices associated with the first stream or the second stream.

In some embodiments, the network messaging schedule can determine communication intervals for the first stream.

In some embodiments, the network messaging schedule can be determined based on a type of data communicated over the first stream.

In some embodiments, the type of data can be audio and the second stream can be configured to communicate asynchronous data.

In some embodiments, the type of data can be reserved bandwidth data and the second stream can be configured to communicate asynchronous data.

In some embodiments, communications with the first stream can take higher priority in the network messaging schedule over communications with the second stream.

In some embodiments, the first set of capabilities can include at least one of a minimum number of bytes or a maximum number of bytes.

In some embodiments, the first set of capabilities can include at least one of a minimum latency or a maximum latency.

In some embodiments, the first set of capabilities can include at least one of a minimum sample size or a maximum sample size.

In some embodiments, the first set of capabilities can include at least one of a minimum sampling rate or a maximum sampling rate.

In some embodiments, the network messaging schedule can be determined in response to a request to open a stream.

In some embodiments, the network messaging schedule can be determined in response to a request to close the first stream.

In some embodiments, the network messaging schedule can be determined in response to the first stream becoming an inactive stream.

In some embodiments, the network messaging schedule can be determined in response to the first stream becoming an active stream.

In some embodiments, the arbiter device can broadcast a time instant at which to initiate communications according to the network messaging to the one or more client devices.

In some embodiments, the arbiter device can broadcast the time instant to the one or more client devices multiple times.

In some embodiments, a wireless electronic device can be configured to receive a first set of capabilities associated with a first stream to be opened, receive a second set of capabilities associated with a second stream to be opened, determine a network messaging schedule based on the first set of capabilities and the second set of capabilities, and send the messaging schedule to one or more client devices associated with the first stream or the second stream.

In some embodiments, the first stream can be configured to communicate audio and the second stream is configured to communicate asynchronous data.

In some embodiments, a method can include: receiving a first set of capabilities associated with a first stream to be opened; receiving a second set of capabilities associated with a second stream to be opened; determining a network messaging schedule based on the first set of capabilities and the second set of capabilities; and sending the network messaging schedule to one or more client devices associated with the first stream or the second stream.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

DETAILED DESCRIPTION OF SOME EMBODIMENTS

Figure 1:
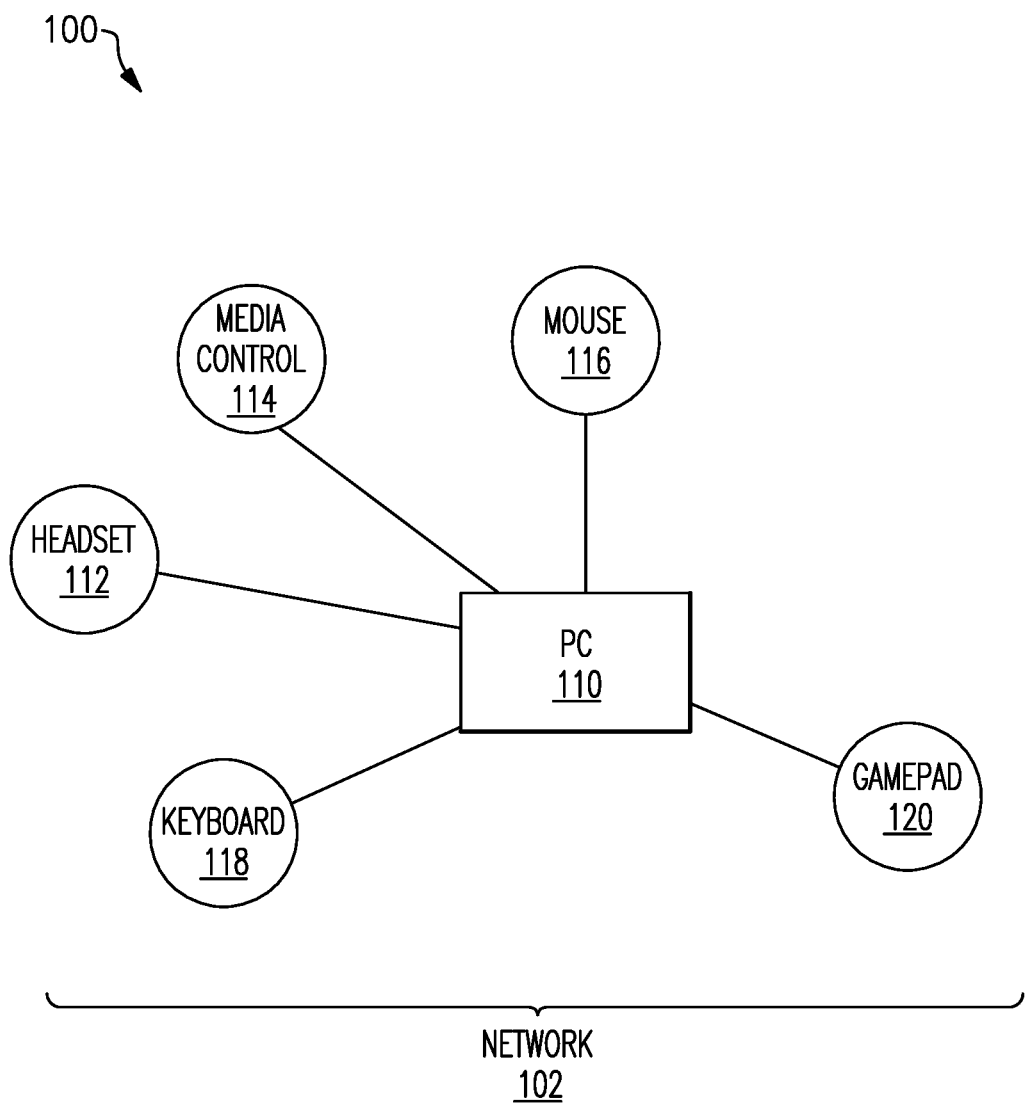
FIG. 1 depicts an example network topology of wireless electronic devices, in accordance with one or more embodiments.

The headings provided herein, if any, are for convenience only and do not necessarily affect the scope or meaning of the claimed invention.

Advancements in wireless connectivity has enabled many traditionally wired applications to become entirely wireless. Wireless gaming, wireless audio, and wireless charging are but a few such transformed applications that have gone from wired to wireless. Unfortunately, the transformation of wired to wireless is not without challenges.

One such challenge may arise in managing communications between wireless devices where available bandwidth is limited. Unlike in the past when relatively small number of devices were wireless, wireless devices are ubiquitous today. Take a typical home for an example. The home probably houses a smart TV, smart thermostat, smart light bulb, smart door security, smart media fobs, various smart sensors, and other wireless devices. Each of these devices vie for its share of bandwidth. This contentious use of limited bandwidth can result in information traffic congestion that can severely degrade wireless communication performance.

Unfortunately, conventional technologies offer little to no relief in addressing the congested bandwidth usage. Under conventional technologies, a host device allows each connected client device to open a communication stream (hereinafter, referred as a "stream") without awareness of streams of other connected client devices. This lack of awareness can result in wasted bandwidth.

For example, a first client device may open a first stream with the host device (e.g., an arbiter device) having a first communication interval with which the first client device is to communicate with the host device. A second client device may open a second stream with the host device (e.g., the arbiter device) having a second communication interval with which the second client device is to communicate with the host device. The first communication interval and the second communication interval may overlap in time and space with each other, thereby causing overlapping communication intervals. The overlapping communication intervals can result in information traffic congestion which may cause not insignificant amount of data to be dropped (e.g., unacknowledged) in transmit and the host device may need to retransmit the dropped data.

Continuing with the example, the first stream may communicate time-sensitive audio that should be prioritized over asynchronous data that is less time-sensitive. For instance, the first stream may be transmitting VoIP data while the second stream may be fetching promotional video content from a merchant. The conventional technologies are not aware of priorities associated with such different types of streams and, thus, inefficiently allow less important asynchronous data to hog limited bandwidth over very important audio. In another instance, an active stream may become inactive or closed but other streams may not be able to take advantage of the reserved bandwidth of the now inactive stream.

Accordingly, the host device does not know how to provide a messaging schedule that can wholistically account for and efficiently allocate bandwidth for multiple streams. Improved approaches disclosed herein can address such challenges by providing a messaging schedule that can intelligently account for multiple streams. The messaging schedule can help minimize wasteful bandwidth usage.

FIG. 1 depicts an example network topology 100 of wireless electronic devices, in accordance with one or more embodiments. The example network topology 100 includes a network 102. A PC 110 is a central hub of the network 102. The PC 110 is wirelessly connected to a headset 112, media control (e.g., a remote control) 114, wireless mouse 116, keyboard 118, and gamepad 120. In the present disclosure, the host device PC 110 is referred as "arbiter" or "arbiter device" and the wireless devices 112, 114, 116, 118, 120 are referred as "clients" or "client devices."

As described, when many client devices are communicating with an arbiter device, each client device may vie for a share of available bandwidth. For example, in FIG. 1, the client devices 112, 114, 116, 118, 120 are trying to communicate with the PC 110 and vying for bandwidth with their own messaging schedules. Accordingly, the client devices 112, 114, 116, 118, 120 may experience degraded communication performance. While five client devices 112, 114, 116, 118, 120 are illustrated, any number of client devices may be considered. It is noted that while the network 102 in the example network topology 100 is depicted as networks having star topologies, any topology including star, mesh, cluster-tree, combination thereof, or another topology are contemplated.

Figure 2A:
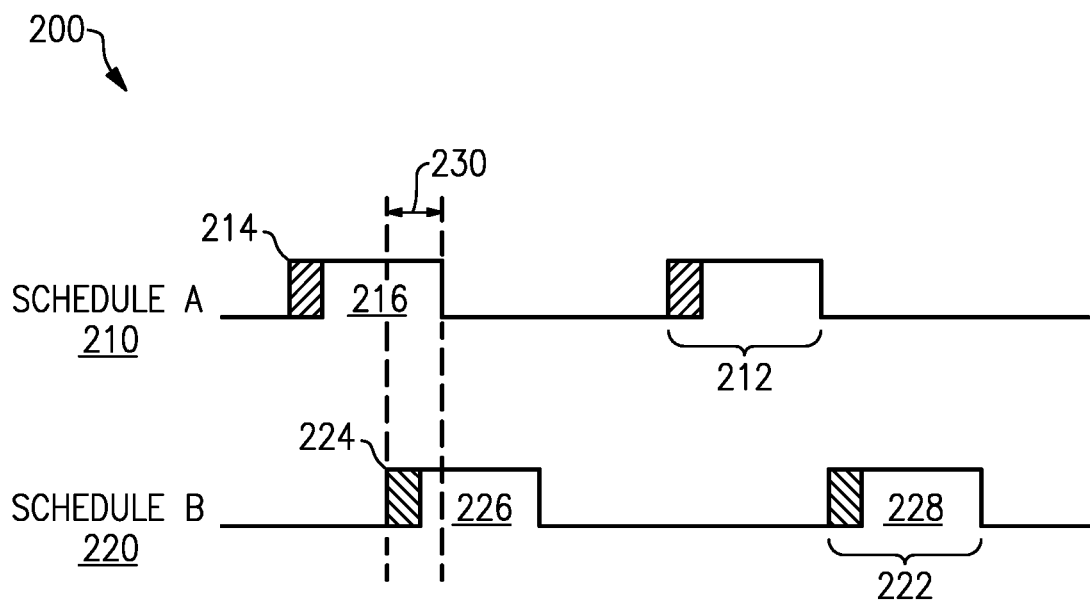
FIGS. 2A-2B depict example scheduling approaches, in accordance with one or more embodiments.
Figure 2B:
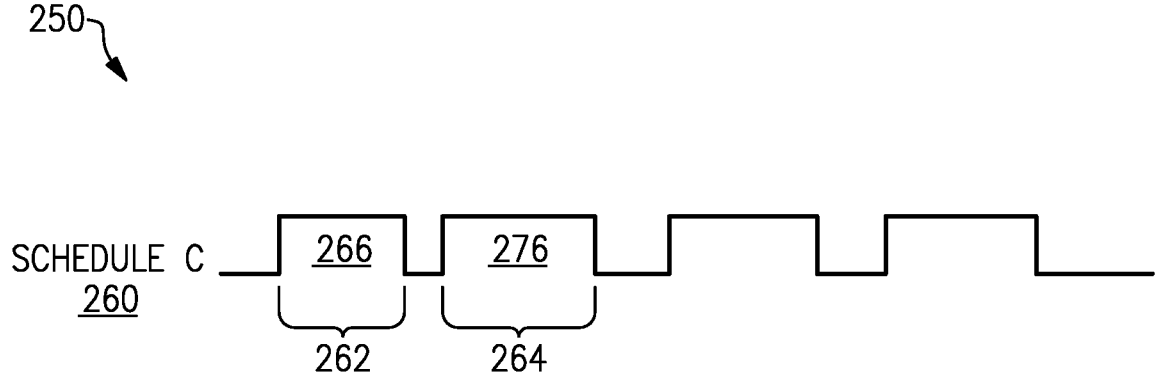

FIGS. 2A-2B depict example scheduling approaches, in accordance with one or more embodiments. Specifically, FIG. 2A depicts a conventional scheduling approach 200 and FIG. 2B depicts an improved scheduling approach 250. In the FIGS. 2A-2B, time flows from left to right.

The conventional scheduling approach 200 is described with a first messaging schedule (schedule A) 210 and a second messaging schedule (schedule B) 220. In some instances, schedule A 210 and the schedule B 220 can be for streams of a single client device. For example, the schedule A 210 can be for an audio stream of the single client device and the schedule B 220 can be for a data stream of the single client device. In some other instances, the schedules A and B 210, 220 can be for different client devices. For example, the schedule A 210 can be for an audio stream of a first stream and the schedule B 220 can be for an audio stream of a second client device.

The schedule A 210 depicts a communication interval 212 and the one before during which a first stream can communicate with an arbiter device. The schedule B 220 depicts a communication interval 222 and the one before during which a second stream can communicate with the arbiter device. The first and the second streams here have already been opened without regard to the other stream. As illustrated, some communication intervals of the schedule A 210 can overlap with some communication intervals of the schedule B 220. In FIG. 2A, a first communication interval of schedule A 210 during which first data 216 is communicated overlaps by an amount 230 with a second communication interval of the schedule B 220 during which second data 226 is communicated. In some scenarios, the overlapping of the communication intervals can result in failed handling of the second data 226 and, thus, cause the second stream to retransmit the second data 226. For instance, the second stream may need to retransmit the previously transmitted second data 226 during the communication interval 222 as repeated data 228.

In contrast, the improved scheduling approach 250 of FIG. 2B allows better (arguably, optimal) use of bandwidth. Under the improved scheduling approach 250, the arbiter device can receive and examine scheduling requests of the first stream and the second stream to determine a combined schedule C 260 that can remove (or substantially remove) overlapping duration(s) as illustrated. In the schedule C 260, data 266 is the first data 216 which were to be transmitted/received in accordance to the schedule A 210. Additionally, in the schedule C 260, data 276 is the second data 226 which were to be transmitted/received in accordance to the schedule B 220. As shown in the schedule C 260, communication intervals in the schedule A 210 and the schedule B 220 have been shifted, respectively to the left and to the right, to remove overlapping communication intervals. The arbiter device can communicate the schedule C 260 to one or more client devices associated with the first stream and/or the second stream. Based on the schedule C 260, the client device(s) may then open a stream with knowledge of when to allocate communication intervals. As a result, the schedule C 260 can help reduce overlapping durations, reduce the need for retransmission, and, thus, reduce bandwidth waste.

The schedule C 260 may help reduce bandwidth waste in other ways as well. Under the conventional technologies, the arbiter device may be aware that two streams may talk over each other during overlapping communication intervals. In such instances, the arbiter device may need to distinguish data received on a first stream from data received on a second stream. Conventional technologies may distinguish the two data associated with respective streams based on stream identifiers that are prepended (or appended) to the two data. For instance, the first data 216 from the first stream can have a first header 214 and the second data 226 from the second stream can have a second header 224 to help the arbiter device distinguish the two data 216, 226.

The headers 214, 224 may be removed under the improved scheduling approach 250. As described, the schedule C 260 is determined by the arbiter device and communicated to client device(s) associated with the streams. Accordingly, arbiter device and the client devices are aware of when to communicate with the arbiter device. The streams have respective communication intervals 262, 264 that do not overlap with the other. Accordingly, the arbiter device may distinguish data of each stream without need for use of headers, thus, further reducing bandwidth waste.

Figure 3:
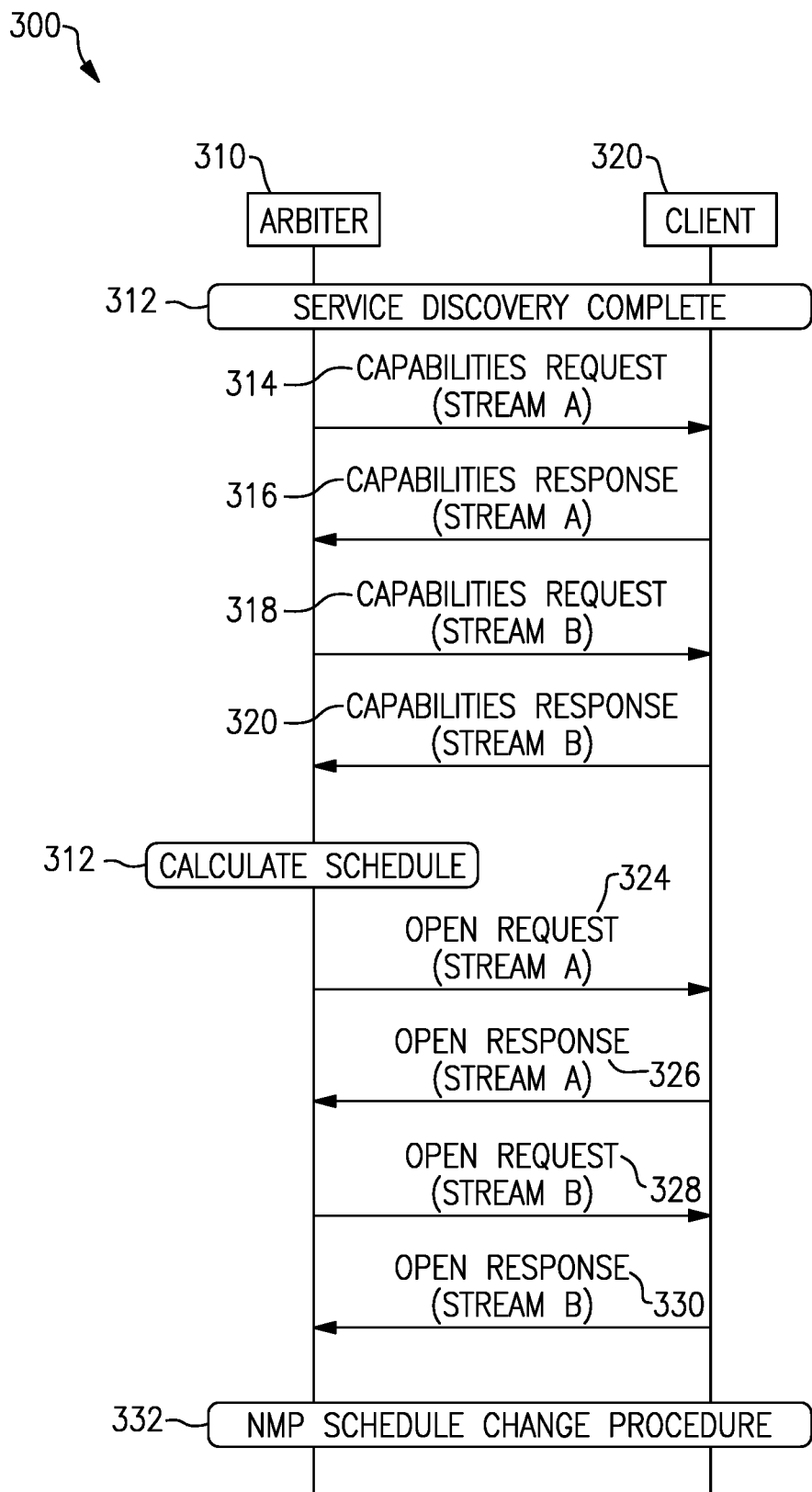
FIG. 3 illustrates an example procedure for opening multiple streams, in accordance with one or more embodiments.

FIG. 3 illustrates an example procedure 300 for opening multiple streams, in accordance with one or more embodiments. In the example procedure 300, a client device 320 opens two streams (stream A and stream B) with the arbiter device 310. While the example procedure 300 shows one client device 320 opening the two streams, as described above, each of the two streams can be of a different client device. Further, it is noted that the example procedure 300 can be expanded to include any number of client devices and streams.

At block 312, the arbiter device 310 has discovered services available on the client device 320. Some example services providable by the client device 320 can include audio service for sending or receiving audio, human interface device (HID) service for sending and receiving HID data, battery service for sending and receiving battery information, media control service for sending and receiving media control button or UI information, to name a few.

The arbiter device 310 can send capabilities request message 314 (e.g., a message requesting a set of capabilities of a client device) to the client device 320 regarding the stream A. In response, the client device 320 can send a capabilities response message 316 containing information relating to communication capabilities of the stream A.

The communication capabilities may be defined by various parameters that can include communication direction (Rx or TX), types of data to be communicated, minimum and maximum number of bytes per transaction, minimum and maximum acceptable latency in transactions, minimum and maximum sample sizes, minimum and maximum latency, minimum and maximum sampling rate, whether to allow redundant acknowledgements, or the like. Depending on the type of stream (e.g., audio or data, synchronous or asynchronous, etc.) the response communication capabilities may vary.

In a similar manner with the capabilities request 314 and response 316, the arbiter device 310 can send capabilities request message 318 and receive capabilities response message 320 for the stream B.

At block 322, the arbiter device 310 can calculate (determine) a network schedule. The determination of the network schedule can take into account the capabilities received with regard to the streams A and B to provide a combined network schedule (e.g., the schedule C 260 of FIG. 2B). For example, the arbiter device 310 can examine capabilities such as minimum and maximum number of bytes per transaction and minimum and maximum latency to adjust respective communication intervals for the streams A and B. In other words, the arbiter device 310 may adjust communication interval periods, transaction lengths, and other communication properties based on the learned capabilities to determine the combined network schedule.

In some embodiments, the arbiter device 310 can determine the combined network schedule based on types of data stream. For example, if a stream is to communicate asynchronous data, which can often be of low priority, then the arbiter device 310 can schedule communication intervals for the asynchronous data seldom with long transaction lengths and greater latency. As another example, if a stream is to communicate audio or reserved bandwidth data, which are often of higher priority, the arbiter device 310 can schedule communication intervals for the audio or reserved bandwidth data frequently with short transaction lengths and minimal latency. Accordingly, the combined network schedule can prioritize different types of data for the streams.

After the network schedule is determined, the arbiter device 310 can open the stream A by sending an open request message 324 and receiving an acknowledgement message 326 that the stream A is opened. Similarly, the arbiter device 310 can open the stream B with open request message 328 and acknowledgement message 330.

Figure 4:
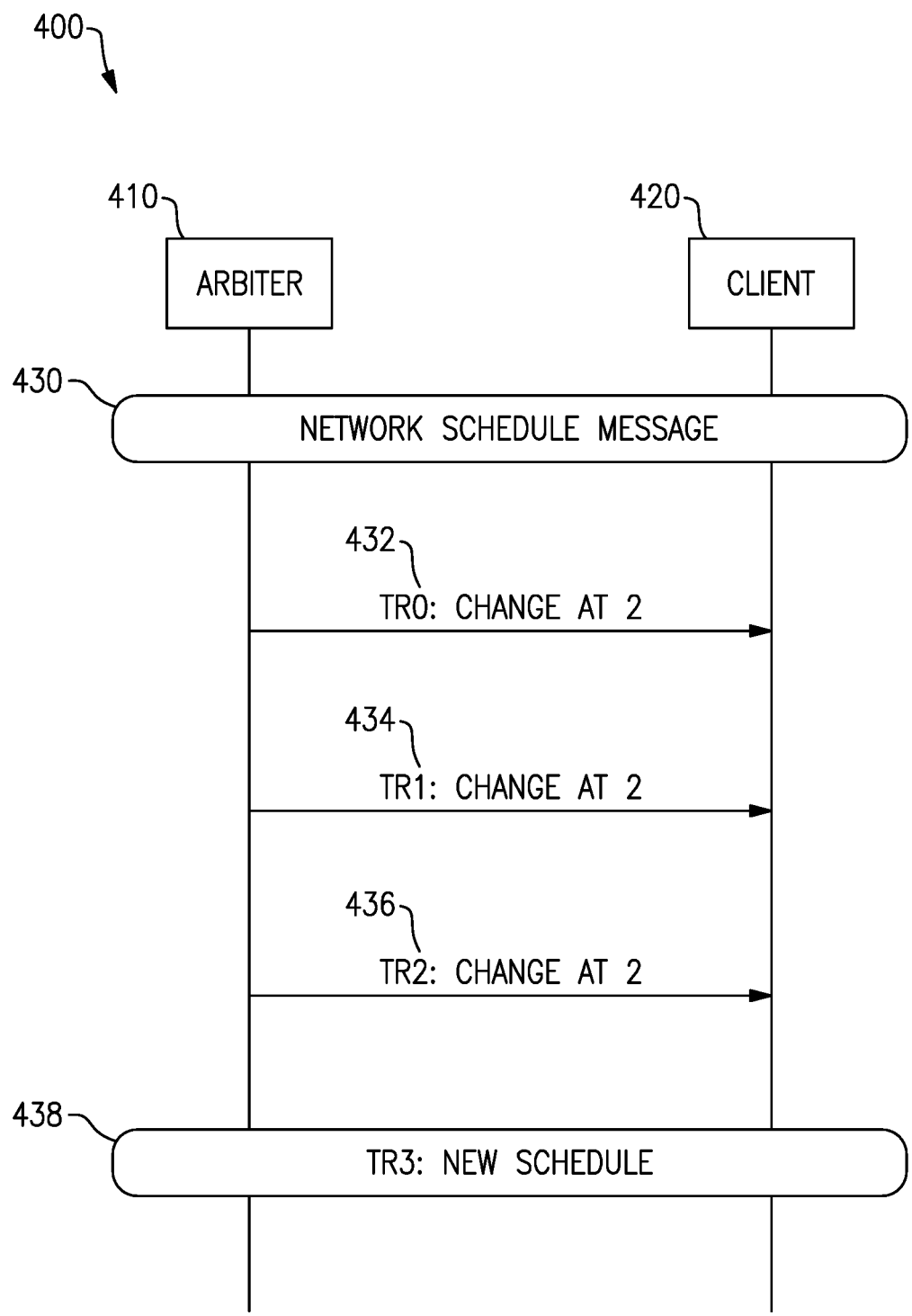
FIG. 4 depicts an example network schedule change procedure 400 that can be used to inform a client device(s) of a network schedule, in accordance with one or more embodiments.

At block 332, the arbiter device 310 can initiate a network messaging protocol schedule (NMP) schedule change procedure. The NMP schedule change procedure can send the combined network schedule to the client device 320. If streams are to be opened for multiple client devices, the arbiter device 310 can send the combined network schedule to each of the client devices. FIG. 4 provides greater detail on how the arbiter device 310 can send the combined network schedule to the client device 320.

It is to be noted that, as illustrated, the a single NMP schedule change procedure can be sufficient for multiple streams. Getting all capabilities prior to opening the streams allows the arbiter device 310 to change the network schedule only once. The single use of the NMP schedule change procedure can help reduce the number of schedule changes. This is beneficial as multiple performances of the NMP schedule change procedure may cause audio (or data) interruptions.

Further, while FIG. 3 illustrates determination and provision of a network schedule (block 332) for opening of streams, the determination and provision of a network schedule can be initiated as a result of other types of stream changes. For example, a stream can be removed. As another example, an active stream can become inactive. As yet another example, an inactive stream can become active. In some scenarios, a network schedule can be re-determined based on such other types of stream changes and address needs of data in (or substantially in) real-time.

FIG. 4 depicts an example network schedule change procedure 400 that can be used to inform a client device(s) of a network schedule, in accordance with one or more embodiments. The network schedule change procedure 400 can be implemented at block 332 of FIG. 3.

With regard to sending the network schedule to the client device(s), in some instances, not all client devices may be able to acknowledge the network schedule at the same time. For instance, some clients could be asleep and miss the network schedule. Accordingly, the inability of the clients to acknowledge and apply the network schedule at the same time can pose new challenges.

The example network reconfigure procedure 400 can help address the challenges. In the procedure 400, an arbiter device 410 has provided a client device 420 with a network schedule message 430 that includes a network schedule.

Here, the network schedule is not to be applied by the arbiter device 410 and the client device 420 immediately but to be applied at a future agreed upon time. The arbiter device 410 can inform (e.g., broadcast or through targeted transmission) the client device 420 of the future agreed upon time or time instant. For example, the arbiter device 410 can send transactional messages 432, 434, 436 that the network schedule should be applied at or after "transaction time 2" (e.g., for communications after the "transaction time 2"). Having received the transactional messages 432, 434, 436, the client device 420 applies the network schedule at or after "transaction time 2." Accordingly, from "transaction time 3," communication intervals of the arbiter device 410 and the client device 420 can be synched consistent with the network schedule. While three transactional messages 432, 434, 436 are illustrated in FIG. 4, it is to be noted that any number of transactional messages may be sent from the arbiter device 410 to the client device 420 between blocks 430 and 438.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional sub-components to be performed separately. In some instances, the order of the steps and/or phases can be rearranged and certain steps and/or phases may be omitted entirely. Also, the methods described herein are to be understood to be open-ended, such that additional steps and/or phases to those shown and described herein can also be performed.

Some aspects of the systems and methods described herein can advantageously be implemented using, for example, computer software, hardware, firmware, or any combination of computer software, hardware, and firmware. Computer software can comprise computer executable code stored in a computer readable medium (e.g., non-transitory computer readable medium) that, when executed, performs the functions described herein. In some embodiments, computer-executable code is executed by one or more general purpose computer processors. A skilled artisan will appreciate, in light of this disclosure, that any feature or function that can be implemented using software to be executed on a general purpose computer can also be implemented using a different combination of hardware, software, or firmware. For example, such a module can be implemented completely in hardware using a combination of integrated circuits. Alternatively or additionally, such a feature or function can be implemented completely or partially using specialized computers designed to perform the particular functions described herein rather than by general purpose computers.

Multiple distributed computing devices can be substituted for any one computing device described herein. In such distributed embodiments, the functions of the one computing device are distributed (e.g., over a network) such that some functions are performed on each of the distributed computing devices.

Some embodiments may be described with reference to equations, algorithms, and/or flowchart illustrations. These methods may be implemented using computer program instructions executable on one or more computers. These methods may also be implemented as computer program products either separately, or as a component of an apparatus or system. In this regard, each equation, algorithm, block, or step of a flowchart, and combinations thereof, may be implemented by hardware, firmware, and/or software including one or more computer program instructions embodied in computer-readable program code logic. As will be appreciated, any such computer program instructions may be loaded onto one or more computers, including without limitation a general purpose computer or special purpose computer, or other programmable processing apparatus to produce a machine, such that the computer program instructions which execute on the computer(s) or other programmable processing device(s) implement the functions specified in the equations, algorithms, and/or flowcharts. It will also be understood that each equation, algorithm, and/or block in flowchart illustrations, and combinations thereof, may be implemented by special purpose hardware-based computer systems which perform the specified functions or steps, or combinations of special purpose hardware and computer-readable program code logic means.

Furthermore, computer program instructions, such as embodied in computer-readable program code logic, may also be stored in a computer readable memory (e.g., a non-transitory computer readable medium) that can direct one or more computers or other programmable processing devices to function in a particular manner, such that the instructions stored in the computer-readable memory implement the function(s) specified in the block(s) of the flowchart(s). The computer program instructions may also be loaded onto one or more computers or other programmable computing devices to cause a series of operational steps to be performed on the one or more computers or other programmable computing devices to produce a computer-implemented process such that the instructions which execute on the computer or other programmable processing apparatus provide steps for implementing the functions specified in the equation(s), algorithm(s), and/or block(s) of the flowchart(s).

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be embodied in such program instructions, although some or all of the disclosed functions may alternatively be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips and/or magnetic disks, into a different state.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list. The word "exemplary" is used exclusively herein to mean "serving as an example, instance, or illustration." Any implementation described herein as "exemplary" is not necessarily to be construed as preferred or advantageous over other implementations.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings of the invention provided herein can be applied to other methods and systems, and are not limited to the methods and systems described above, and elements and acts of the various embodiments described above can be combined to provide further embodiments. Accordingly, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A system comprising:
a memory device;
at least one computer processor coupled to the memory device;
an asynchronous data stream to be opened with an arbiter device and a client device, the asynchronous data stream associated with a first set of capabilities;
an audio stream to be opened with the arbiter device and the client device, the audio stream associated with a second set of capabilities; and
a wireless network architecture that determines a network messaging schedule based on the first set of capabilities and the second set of capabilities,
the network messaging schedule and a time instant at which to initiate communications according to the network messaging schedule sent to the client device associated with the asynchronous stream and the second audio stream.

2. The system of claim 1 wherein the network messaging schedule is the same network messaging schedule for the asynchronous data stream and the audio stream.

3. The system of claim 1 wherein the first set of capabilities includes at least one parameter specifying that the asynchronous data stream is configured to communicate asynchronous data.

4. The system of claim 3 wherein communications with the asynchronous data stream takes lower priority in the network messaging schedule over communications with the audio stream.

5. The system of claim 1 wherein the second set of capabilities includes at least one parameter specifying that the audio data stream is configured to communicate audio data.

6. The system of claim 1 wherein the network messaging schedule determines first communication intervals for the asynchronous data stream based on the first set of capabilities and second communication intervals for the audio stream based on the second set of capabilities.

7. The system of claim 6 wherein the first communication intervals has longer transaction lengths and grater latency compared to the second communication intervals.

8. The system of claim 1 wherein the arbiter device determines the first set of capabilities based on a first capabilities response message received from the client device in response to a first capabilities request message sent to the client device.

9. The system of claim 8 wherein the arbiter device determines the second set of capabilities based on a second capabilities response message received from the client device in response to a second capabilities request message sent to the client device.

10. The system of claim 9 wherein the arbiter device determines the network messaging schedule after receiving both the first capabilities response message and the second capabilities request message from the client device.

11. The system of claim 10 wherein the arbiter device sends a first open request message for the asynchronous data stream and a second open request message for the audio stream to the client device after determining the network messaging schedule.

12. The system of claim 11 wherein the arbiter device sends the network messaging schedule to the client device after receiving a first open response received in response to the first open request and a second open response received in response to the second open request.

13. The system of claim 1 wherein the network messaging schedule is updated in response to the audio stream becoming an inactive stream.

14. The system of claim 13 wherein the network messaging schedule is updated in response to the audio stream becoming an active stream.

15. The system of claim 13 wherein the wireless network architecture is implemented on the arbiter device.

16. A wireless electronic device, comprising:
a memory device; and
at least one computer processor coupled to the memory device, the memory device including computer code executable by the at least one computer processor to:
receive a first set of capabilities associated with an asynchronous data stream to be opened with a client device;
receive a second set of capabilities associated with an audio stream to be opened with the client device;
determine a network messaging schedule based on the first set of capabilities and the second set of capabilities; and
send the network messaging schedule and a time instant at which to initiate communications according to the network messaging schedule to the client device associated with the asynchronous data stream and the audio stream.

17. The wireless electronic device of claim 16 wherein the first set of capabilities includes at least one parameter specifying that the asynchronous data stream is configured to communicate asynchronous data.

18. The wireless electronic device of claim 16 the second set of capabilities includes at least one parameter specifying that the audio data stream is configured to communicate audio data.

19. The wireless electronic device of claim 17 wherein communications with the asynchronous data stream takes lower priority in the network messaging schedule over communications with the audio stream.

20. A computer-implemented method comprising:
receiving a first set of capabilities associated with an asynchronous data stream to be opened with a client device;
receiving a second set of capabilities associated with an audio stream to be opened with the client device;
determining a network messaging schedule based on the first set of capabilities and the second set of capabilities; and
sending the network messaging schedule and a time instant at which to initiate communications according to the network messaging schedule to the client device associated with the asynchronous data stream and the audio stream.

* * * * *